United States Patent
Badawy et al.

(10) Patent No.: US 10,396,849 B1
(45) Date of Patent: Aug. 27, 2019

(54) NON-COHERENT ULTRA-WIDEBAND RECEIVER

(71) Applicant: QATAR UNIVERSITY, Doha (QA)

(72) Inventors: Ahmed Badawy, Doha (QA); Tarek Elfouly, Doha (QA); Tamer Khattab, Doha (QA); Carla Fabiana Chiasserini, Turin (IT); Daniele Trinchero, Turin (IT); Mohamed Hossam Ahmed, Ottawa (CA)

(73) Assignee: Qatar University, Doha (QA)

( * ) Notice: Subject to any disclaimer, the term of this patent is extended or adjusted under 35 U.S.C. 154(b) by 0 days.

(21) Appl. No.: 15/980,675

(22) Filed: May 15, 2018

(51) Int. Cl.
H04B 1/7163 (2011.01)

(52) U.S. Cl.
CPC .............................. H04B 1/71637 (2013.01)

(58) Field of Classification Search
CPC ... H04B 1/7163; H04B 1/71637; H04B 1/719
See application file for complete search history.

(56) References Cited

U.S. PATENT DOCUMENTS

| 8,098,707 | B2* | 1/2012 | Harjani | H04B 1/71637 375/130 |
| 8,644,360 | B2 | 2/2014 | Liu | |
| 9,172,424 | B2 | 10/2015 | Becze | |
| 2006/0083338 | A1* | 4/2006 | Giannakis | H04B 1/71637 375/343 |
| 2007/0153881 | A1* | 7/2007 | Arslan | H04B 1/71637 375/150 |

FOREIGN PATENT DOCUMENTS

| CN | 102075943 A | 5/2011 |
| EP | 1832004 B1 | 7/2015 |
| JP | 5376581 B2 | 12/2013 |

(Continued)

OTHER PUBLICATIONS

Banstola et al. "Review and Design of UWB Transmitter and Receiver." International Journal of Computer Applications 69.13 (2013).

(Continued)

*Primary Examiner* — David B Lugo
(74) *Attorney, Agent, or Firm* — Richard C. Litman

(57) ABSTRACT

The non-coherent ultra-wideband receiver receives an ultra-wideband (UWB) signal, consisting of pulses (or "symbols") and uses on-off keying (OOK) modulation so that when a binary "0" is transmitted, the receiver collects noise-only samples. The receiver collects samples during the symbol (pulse) duration and sorts the samples by magnitude of voltage or energy. The receiver uses the known transmission rate and the estimated signal-to-noise ratio to retrieve a sample index from a look-up table. The receiver then compares the signal sample at the index value with a predetermined threshold voltage (or energy). If the selected sample exceeds the threshold, then it is assumed that all succeeding samples also exceed the threshold (assuming the sort is in ascending magnitude) and the pulse is present and binary "1". Otherwise, the pulse is absent in the sampling period, and binary "0". The process is repeated for the signal duration.

6 Claims, 6 Drawing Sheets

(56) References Cited

FOREIGN PATENT DOCUMENTS

KR          2013126225  A     11/2013

OTHER PUBLICATIONS

Colli-Vignarelli et al. "A discrete-component Impulse-Radio Ultra-Wide Band (IR-UWB) receiver with I/Q demodulation." Ph. D. Research in Microelectronics and Electronics (PRIME), 2011 7th Conference on. IEEE, 2011.
Huang et al. "Ultra-wideband wireless receiver front-end for high-speed indoor applications." The Journal of Engineering 1.1 (2014).
Cacciatori, Alessio. "Design, Optimization, and Production of an Ultra-Wideband Receiver." Wireless Design & Development. Oct. 5, 2015.

* cited by examiner

NON-COHERENT ULTRA-WIDEBAND RECEIVER

BACKGROUND

1. Field

The disclosure of the present patent application relates to ultra-wideband radio receivers, and particularly to a non-coherent ultra-wideband receiver for receiving on/off keyed signals.

2. Description of the Related Art

In general, a coherent detector operates by mixing an incoming data signal with a locally generated carrier reference and selecting the difference component from the mixer output. A non-coherent detector, by contrast, may comprise only a diode and a smoothing filter. Although simple to implement in hardware, the non-coherent detector has reduced ability to distinguish the wanted signal from noise, as compared to the coherent detector.

Ultra-wideband (UWB) is very different from traditional continuous wave RF-carrier signal transmissions. In UWB signaling, the transmission uses very short impulses of radio energy. A UWB signal may utilize an impulse transmission technique in which an ultra-short duration pulse (typically tens of picoseconds to a few nanoseconds in duration) is directly applied to the antenna, resulting in a low power, wide frequency band response signal being transmitted, useful for short range data communications. Such systems are sometimes called carrier-free, since no apparent carrier frequency is evident in the resulting RF spectrum. Such UWB systems often include ON-OFF keying, binary amplitude shift keying (ASK), and pulse position modulation (PPM). The FCC and the International Telecommunication Union Radiocommunication Sector currently define UWB as an antenna transmission for which emitted signal bandwidth exceeds the lesser of 500 MHz or 20% of the arithmetic center frequency. Thus, e.g., an orthogonal frequency-division multiplexing (OFDM) signal can now access the UWB spectrum.

Fully coherent ultra-wideband (UWB) receivers, such as optimal matched filtering, often implemented using rake reception, have high performance that comes at the cost of high hardware and implementation complexities. Moreover, they require side information about the structure of the signal, channel and interference to be known a priori. Suboptimal UWB receivers, such as auto-correlation receivers, relax the requirements of rake receivers, since they do not require any side information about the channel. However, they require precise waveform delay, which makes their implementation challenging.

On the other hand, non-coherent receivers have much lower hardware and computational complexities. However, they have lower performance than coherent receivers. The most popular non-coherent receiver is energy detection. Receivers based on energy detection are easy to implement, but they are susceptible to varying background noise and interference levels. Due to the peculiarity of UWB systems, the symbol time is usually much larger than the duration of the transmitted short pulse. This, in addition to channel delay spread, leads to a stringent requirement on the tuning window. Otherwise, noise-only samples will be collected, which leads to a higher noise floor. Single and dual peak receivers have comparable performance to energy detection receivers. However, as the detection window increases, energy detection receivers collect more noise samples, which leads to a performance gap in favor of single and dual peak receivers.

The problem of Additive White Gaussian Noise (AWGN) in the communications channel often makes it difficult to distinguish a binary "1" from a binary "0" in a non-coherent UWB receiver, in which detection is usually based only on the amplitude of the signal without any information regarding phase or other characteristics of the signal. Thus, a non-coherent ultra-wideband receiver solving the aforementioned problems is desired.

SUMMARY

The non-coherent ultra-wideband receiver receives an ultra-wideband (UWB) signal, consisting of pulses (or "symbols") and uses on-off keying (OOK) modulation so that when a binary "0" is transmitted, the receiver collects noise-only samples. The receiver collects samples during the symbol (pulse) duration and sorts the samples by magnitude of voltage or energy. The receiver uses the known transmission rate and the estimated signal-to-noise ratio to retrieve a sample index from a look-up table. The receiver then compares the signal sample at the index value with a predetermined threshold voltage (or energy). If the selected sample exceeds the threshold, then it is assumed that all succeeding samples also exceed the threshold (assuming the sort is in ascending magnitude) and the pulse is present and binary "1". Otherwise, the pulse is absent in the sampling period, and binary "0". The process is repeated for the signal duration.

The index in the look-up table is learned from prior experience. The index corresponds to the average number of samples that will exceed the threshold amplitude at the known transmission rate and the estimated signal-to-noise ratio when a binary "1" is transmitted for a given sampling period or sampling rate. Thus, if it is known from prior experience that forty-eight samples will exceed the threshold at the known transmission rate and estimated signal-to-noise ratio, then the receiver examines the forty-eighth sample in the set of sorted signal samples (assuming the samples are sorted in descending order of magnitude; if in ascending order of magnitude, then sample N–48 is examined, where N is the number of samples in the sorted set) and compares it to the threshold voltage (or energy). If the forty-eighth sorted signal sample exceeds the threshold, then the receiver interprets the received pulse as binary "1" (if the samples are sorted in descending order of magnitude, since samples 1 through 47 would all have magnitudes greater than the forty eighth sample; it is unnecessary to compare each sample value to the threshold and count the number exceeding the threshold, since the sample values are already sorted by magnitude of the voltage amplitude); otherwise, as binary "0". The process is repeated until the transmitted information has been received and interpreted or decoded.

A set of time domain samples is recorded from each pulse of the non-coherent ultra-wideband signal, with each time domain sample of the set of time domain samples having an amplitude associated therewith. Each of the time domain samples in the set of time domain samples is sorted by the amplitude associated therewith to form a set of sorted time domain samples. Each of the sorted time domain samples of the set of sorted time domain samples has a sorting index value assigned thereto. For example, each of the time domain samples in the set of time domain samples may be sorted from highest amplitude to lowest amplitude, with the time domain sample having the greatest amplitude being given an index value of "1", and with the time domain sample having the lowest amplitude being given an index value of N, where N represents the total number of time domain samples in the set of time domain samples. As another example, each of the time domain samples in the set of time domain samples may be sorted from lowest amplitude to highest amplitude, with the time domain sample having the lowest amplitude being given an index value of "1", and with the time domain sample having the greatest amplitude being given an index value of N.

The estimated SNR and the transmission rate are used as inputs for a lookup table stored in non-transitory computer readable memory for retrieval of a secondary index value. The lookup table has a recorded two-dimensional matrix of secondary index values, where a first dimension of the two-dimensional matrix of secondary index values is indexed by an array of possible transmission rate values, and a second dimension of the two-dimensional matrix of secondary index values is indexed by an array of possible estimated signal-to-noise ratio values. The secondary index value corresponding to the input estimated SNR and transmission rate is found and output.

A sorted time domain sample of the set of sorted time domain samples is then selected by selecting the sorted time domain sample having a sorting index value equal to the secondary index value retrieved from the lookup table. The amplitude of the selected sorted time domain sample is compared against a threshold value and the controller either outputs a binary value of one or zero. A binary value of one is output if the amplitude of the selected sorted time domain sample is greater than the threshold value, and a binary value of zero is output if the amplitude of the selected sorted time domain sample is less than or equal to the threshold value.

Alternatively, a similar technique may be used in the analog domain. In this embodiment, the receiver again receives a non-coherent ultra-wideband signal having a known transmission rate. The SNR of the non-coherent ultra-wideband signal is estimated and this estimated signal-to-noise ratio is recorded, along with the known transmission rate. An analog sample of the non-coherent ultra-wideband signal, having a voltage amplitude associated therewith, is recorded. As in the previous embodiment, the transmission rate and the estimated signal-to-noise ratio are used as inputs for a lookup table. However, the lookup table has a recorded two-dimensional matrix of clipping voltage amplitude levels. A first dimension of the two-dimensional matrix of clipping amplitude levels is indexed by an array of possible transmission rate values, and a second dimension of the two-dimensional matrix of clipping amplitude levels is indexed by an array of possible estimated signal-to-noise ratio values. The clipping amplitude level corresponding to the input estimated SNR and transmission rate is found and output.

The analog sample is then clipped above the clipping amplitude value retrieved from the lookup table to produce a clipped analog sample. A clipped amplitude of the clipped analog sample is compared against a threshold value and the controller either outputs a binary value of one or zero. A binary value of one is output if the clipped amplitude of the clipped analog sample is greater than the threshold value, and a binary value of zero is output if the clipped amplitude of the clipped analog sample is less than or equal to the threshold value.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
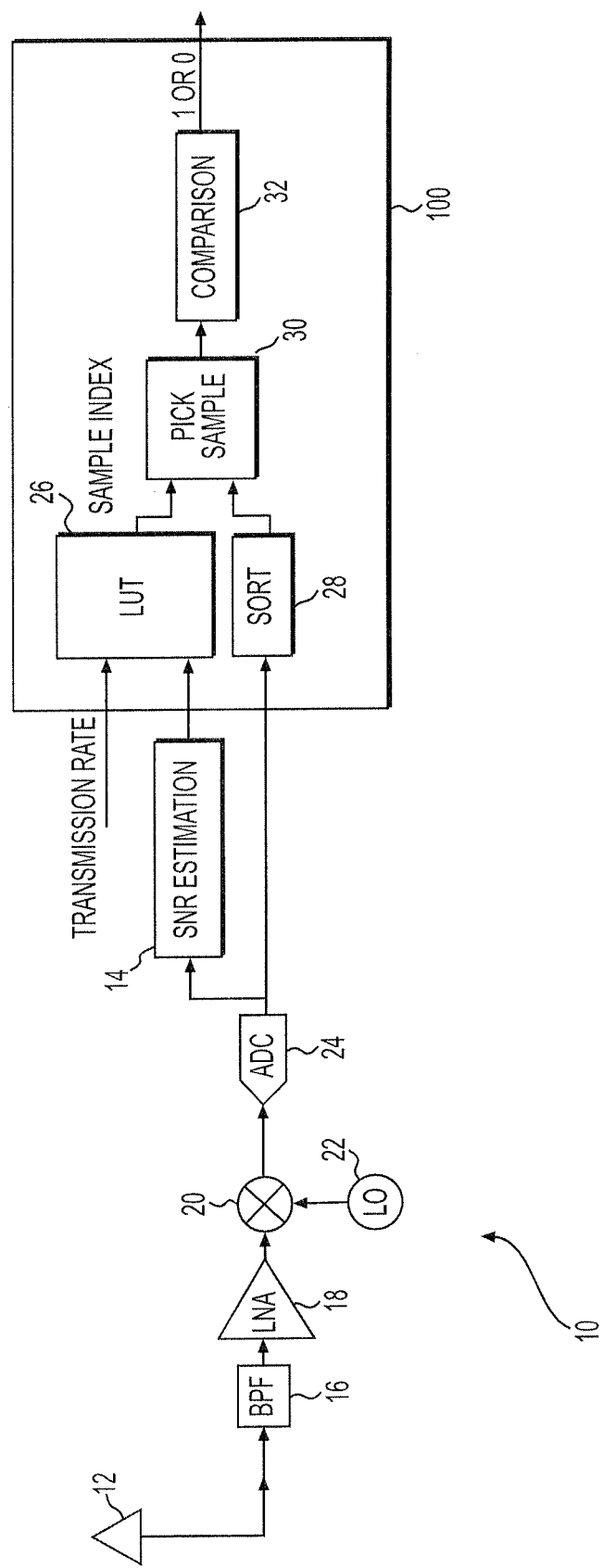
FIG. 1 is a block diagram of the front end of a non-coherent ultra-wideband receiver as described herein, implemented digitally.

The front end of the non-coherent ultra-wideband receiver 10 receives an ultra-wideband (UWB) signal, consisting of pulses (or "symbols"), and outputs either a binary one or zero using the estimated signal-to-noise ratio (SNR) and the known transmission rate as input to index values recorded in a lookup table to select one of a set of signal samples sorted by magnitude for comparison to a threshold vale to distinguish between a binary one and noise. As shown in FIG. 1, in a first embodiment, the front end of the non-coherent ultra-wideband receiver 10 includes a receiver circuit coupled with a controller 100 (which may be a digital signal processor [DSP], microprocessor, or the like) for performing signal analysis, comparison and processing. The receiver portion, as shown, may be any suitable type of UWB receiver. In the example shown in FIG. 1, the receiver portion of the non-coherent ultra-wideband receiver 10 includes a conventional antenna 12 for receiving a non-coherent ultra-wideband signal, which is then fed to a conventional band pass filter (BPF) 16. The BPF 16 is in communication with a conventional low-noise amplifier (LNA) 18 for amplifying the signal, which is then fed to a conventional mixer 20, which may be coupled with a local oscillator (LO) 22, as is conventionally known. The resultant down-converted signal is fed to an analog-to-digital converter (ADC) 24, where it is digitized.

As in conventional UWB transmission, the non-coherent ultra-wideband signal is a signal transmitted as a plurality of pulses (or "symbols") with a known transmission rate. In conventional UWB, the transmission rate is fixed over long transmission periods and does not change from sample to sample. This transmission rate is known at both the transmitter and the receiver. The signal-to-noise ratio (SNR) of the non-coherent ultra-wideband signal is estimated by SNR estimator 14, as known in the art, which may be any suitable type of SNR estimator, and the estimated signal-to-noise ratio may be recorded, along with the known transmission rate, in non-transitory computer readable memory 112 (shown in FIG. 2). As in conventional UWB transmission and reception, there is no modulation and no carrier signal, i.e., the non-coherent ultra-wideband signal consists solely of the pulses (or "symbols") having certain shapes. Similar to an on-off keying system, a detected pulse represents a binary value of one, and no detection of a pulse in the symbol duration (i.e., no transmission, only ambient noise) represents a binary value of zero. Thus, communication occurs through transmitted pulses, representative of binary data.

A set of time domain samples are recorded from each pulse of the non-coherent ultra-wideband signal, with each time domain sample of the set of time domain samples having an amplitude (either voltage or energy) associated therewith. During each pulse, the set of time domain samples from the pulse are collected and recorded, and this occurs for every pulse of the signal at successive time intervals.

Figure 2:
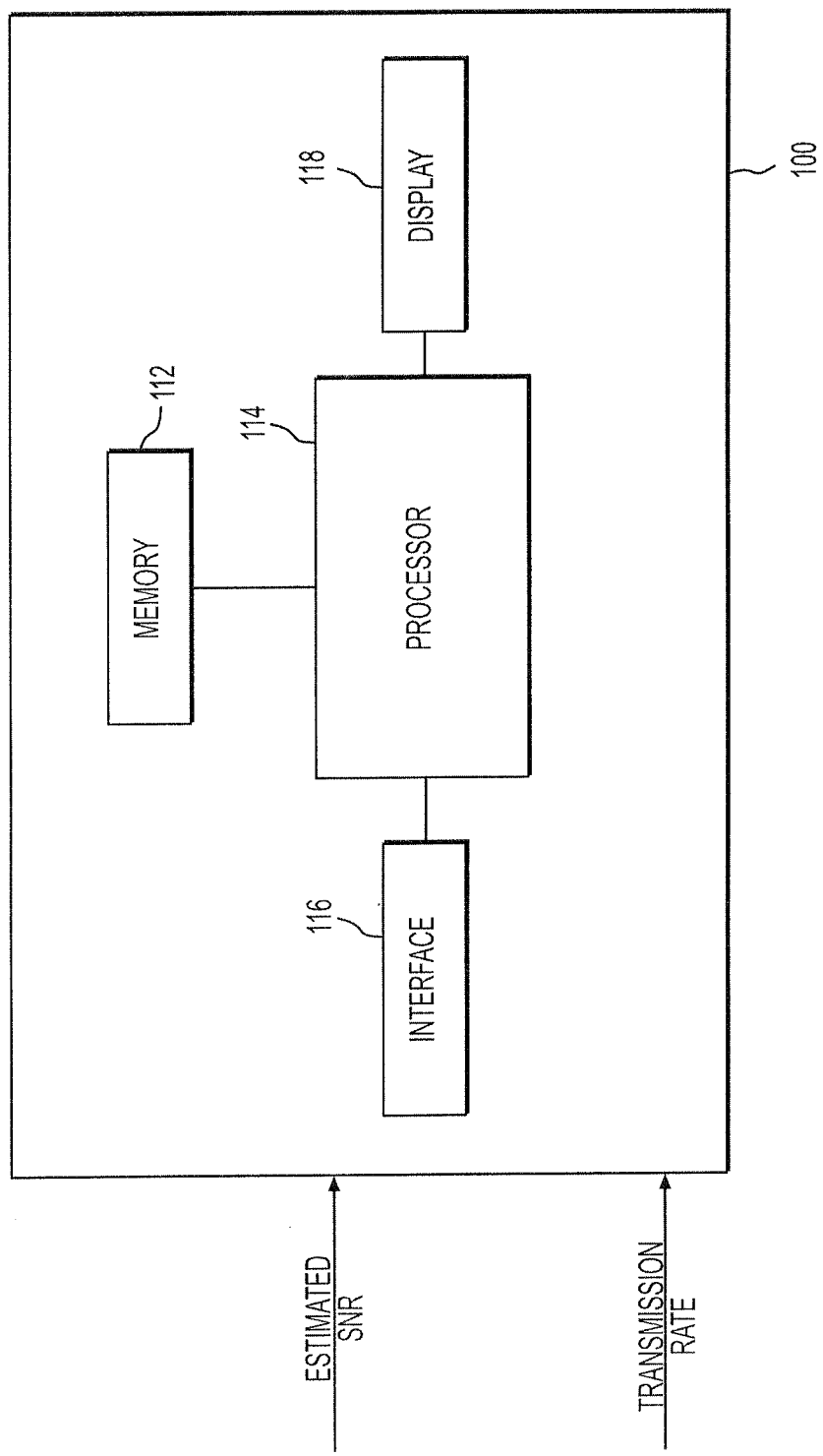
FIG. 2 is a block diagram illustrating components of a controller of the non-coherent ultra-wideband receiver.

Each of the time domain samples in the set of time domain samples is sorted by the amplitude (either voltage or energy) associated therewith to form a set of sorted time domain samples. As shown in FIG. 1, the sorting is performed by the controller 100 (indicated as 28 in FIG. 1), and the sorted results are stored in non-transitory computer readable memory 112 of the controller 100 (as shown in FIG. 2). As in conventional signal analysis, the amplitude associated with each sample may be measured in terms of voltage, energy or the like. Each of the sorted time domain samples of the set of sorted time domain samples has a sorting index value assigned thereto. For example, each of the time domain samples in the set of time domain samples may be sorted from highest amplitude to lowest amplitude, with the time domain sample having the greatest amplitude being given an index value of "1", and with the time domain sample having the lowest amplitude being given an index value of "N", where N represents the total number of time domain samples in the set of time domain samples. Alternatively, each of the time domain samples in the set of time domain samples may be sorted from lowest amplitude to highest amplitude, with the time domain sample having the lowest amplitude being given an index value of "1", and with the time domain sample having the greatest amplitude being given an index value of "N".

The estimated SNR and the transmission rate are used as inputs for a lookup table 26, which is stored in non-transitory computer readable memory 112, for retrieval of a secondary index value. The lookup table 26 has a recorded two-dimensional matrix of secondary index values, where a first dimension of the two-dimensional matrix of secondary index values is indexed by an array of possible transmission rate values, and a second dimension of the two-dimensional matrix of secondary index values is indexed by an array of possible estimated signal-to-noise ratio values. The secondary index value corresponding to the input estimated SNR and transmission rate is found and output. Table 1 below shows an example of such a lookup table, with possible values for SNR ranging between −6 dB and 8 dB, and with possible values of transmission rate (TR) ranging between 25 Mbps and 500 Mbps. This example corresponds to a second derivative Gaussian pulse, with a pulse duration of 2 ns and a bandwidth of 870 MHz. However, it should be understood that these values, and those shown in Table 1, are given for exemplary purposes only.

TABLE 1

Exemplary Lookup Table

| TR | Signal-to-Noise Ratio (dB) | | | | | | | |
|---|---|---|---|---|---|---|---|---|
| Mbps | −6 | −4 | −2 | 0 | 2 | 4 | 6 | 8 |
| 25 | 32 | 19 | 6 | 3 | 1 | 1 | 1 | 1 |
| 50 | 17 | 32 | 17 | 8 | 4 | 2 | 1 | 1 |
| 75 | 5 | 32 | 24 | 13 | 6 | 3 | 1 | 1 |
| 100 | 14 | 32 | 27 | 18 | 9 | 4 | 2 | 2 |
| 125 | 3 | 32 | 28 | 20 | 11 | 6 | 4 | 1 |
| 150 | 29 | 32 | 28 | 19 | 14 | 7 | 3 | 2 |
| 175 | 32 | 32 | 28 | 21 | 15 | 7 | 4 | 2 |
| 200 | 32 | 32 | 28 | 21 | 14 | 8 | 4 | 2 |
| 225 | 31 | 32 | 27 | 21 | 15 | 10 | 6 | 3 |
| 250 | 32 | 31 | 27 | 21 | 17 | 11 | 5 | 3 |
| 275 | 32 | 31 | 25 | 21 | 16 | 12 | 6 | 4 |
| 300 | 32 | 29 | 25 | 20 | 16 | 11 | 7 | 4 |
| 325 | 32 | 28 | 24 | 20 | 16 | 11 | 8 | 4 |
| 350 | 29 | 27 | 23 | 20 | 16 | 13 | 8 | 4 |
| 375 | 28 | 25 | 24 | 19 | 16 | 12 | 7 | 4 |
| 400 | 27 | 25 | 22 | 19 | 17 | 12 | 9 | 5 |
| 425 | 26 | 24 | 21 | 19 | 16 | 14 | 10 | 5 |
| 450 | 25 | 24 | 20 | 18 | 15 | 14 | 8 | 6 |
| 475 | 23 | 22 | 21 | 18 | 15 | 13 | 9 | 5 |
| 500 | 23 | 21 | 19 | 17 | 16 | 14 | 10 | 6 |

A sorted time domain sample of the set of sorted time domain samples is then selected by selecting the sorted time domain sample having a sorting index value equal to the secondary index value retrieved from the lookup table 26 (indicated at 30 in FIG. 1), if the set is sorted in descending order of magnitude; otherwise, the sample equal to (N−secondary index value) is selected. The amplitude of the selected sorted time domain sample is compared against a threshold value, and the controller either outputs a binary value of one or zero (indicated at 32 in FIG. 1). A binary value of one is output if the amplitude of the selected sorted time domain sample is greater than the threshold value, and a binary value of zero is output if the amplitude of the selected sorted time domain sample is less than or equal to the threshold value.

Figure 3:
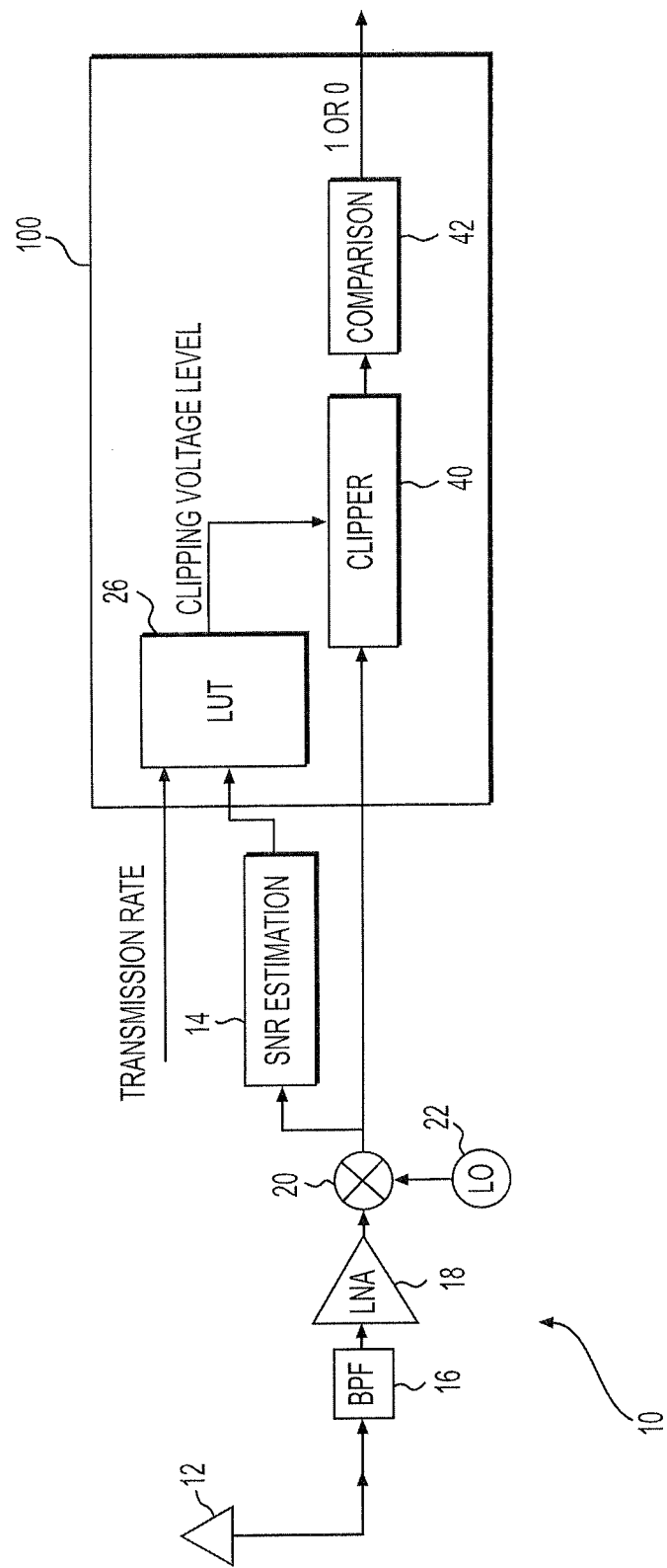
FIG. 3 is a block diagram of an alternative embodiment of the front end of a non-coherent ultra-wideband receiver as described herein, implemented with analog components/circuits.

The above is described as operating in the digital domain. Alternatively, a similar technique may be used in the analog domain. In the alternative embodiment of FIG. 3, the receiver again receives a non-coherent ultra-wideband signal having a known transmission rate. The SNR of the non-coherent ultra-wideband signal is again estimated by SNR estimator 14, and this estimated signal-to-noise ratio may be recorded, along with the known transmission rate, in the non-transitory computer readable memory 112. An analog sample of the non-coherent ultra-wideband signal, having an amplitude associated therewith, may be recorded. As shown in FIG. 3, in this embodiment, there is no analog-to-digital converter in the receiver portion, thus the signal is kept in the analog domain.

As in the previous embodiment, the transmission rate and the estimated signal-to-noise ratio are used as inputs for a lookup table 26. However, the lookup table 26 has a recorded two-dimensional matrix of clipping amplitude levels, i.e., voltage levels of the samples that minimize error probability, as opposed to the secondary index values of the previous embodiment. A first dimension of the two-dimensional matrix of clipping amplitude levels is indexed by an array of possible transmission rate values, and a second dimension of the two-dimensional matrix of clipping amplitude levels is indexed by an array of possible estimated signal-to-noise ratio values. The clipping amplitude level corresponding to the input estimated SNR and transmission rate is found and output.

The analog sample is then clipped by clipper 40 above the clipping amplitude value retrieved from lookup table 26 to produce a clipped analog sample. The clipped signal is then compared against a threshold value by a comparator and timer and a binary one or zero is output (indicated at 42 in FIG. 3). A binary value of one is output if the clipped amplitude of the clipped analog sample is greater than the threshold value, and a binary value of zero is output if the clipped amplitude of the clipped analog sample is less than or equal to the threshold value.

It should be understood that the calculations may be performed by any suitable processor, controller 100 or computer system, such as that diagrammatically shown in FIG. 2. Data may be entered into the controller 100 via any suitable type of user interface 116, and may be stored in memory 112, which may be any suitable type of computer readable and programmable memory, and is preferably a non-transitory, computer readable storage medium. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

The non-coherent ultra-wideband receiver 10 may be used for a wide variety of applications. For example, the non-coherent ultra-wideband receiver 10 may be integrated into the so-called "Internet of Things" (IoT), i.e., a system of connected devices, machines, objects, etc., each of which is provided with a unique identifier and has the ability to sense and/or transmit data to other devices, or to a centralized node over a network. IoT applications range from smart cities and homes to transportation and agriculture. IoT also has military applications, such as boundary surveillance, including harbors. In fact, UWB is on the top list of the technologies to be used with IoT applications. The non-coherent ultra-wideband receiver 10 may be integrated into an IoT application, including, but not limited to, consumer and home applications, smart infrastructures, security and surveillance, healthcare, transportation, retail and industrial applications, etc.

As an example, non-coherent ultra-wideband receiver 10 may be used with smart transportation, such as passenger security and fleet management systems. In such systems, several nodes collect data related to road safety, acceleration and/or environment, and this data is forwarded to a centralized node. The centralized node then forwards the data to a base station (BS). A vehicle, such as a truck, may be continuously monitoring information about the effect of its load on tire pressure, its chassis, etc. and forwards this information to the BS. This information is then sent through the backbone network to the transportation department or a company's office. At the BS, non-coherent ultra-wideband receiver 10 could be used to receive the transmitted data before it is forwarded to the upper protocol layers.

As another example, the non-coherent ultra-wideband receiver 10 may be used with biomedical applications, such as wireless body sensor networks (WBSNs). A WBSN, sometimes also referred to as a "body area network", includes wearable sensors, typically in the form of probes that collect medical information, and this information is transmitted to a fusion center (also referred to as a "network coordinator"). WBSN modules can be embedded inside the human body or attached to it. The WBSN monitors various vital signs and sends them periodically to the network's coordinator for delivery to medical care personnel. As an example, electroencephalogram (EEG) monitoring devices may be used for continuous monitoring and recordation of the vital signs of a patient. The EEG data is first collected from the patient before it gets filtered and amplified. A data compression technique is then applied to the received data. The quantized data may then transmitted through a wireless channel using the non-coherent ultra-wideband receiver 10. The non-coherent ultra-wideband receiver 10 would be desirable in this scheme due to its low transmitted power level. Further, non-coherent ultra-wideband receiver 10 receives the data before the reconstruction step. The received data could then be forwarded to the medical care technician.

As a further example, the non-coherent ultra-wideband receiver 10 could be used for localization, due to its accuracy within the centimeter range. Moreover, its low power and low cost implementation makes it convenient for localization applications, such as logistics tracking and security. The non-coherent ultra-wideband receiver 10 could be used with a variety of localization techniques, such as received signal strength-based applications, angle of arrival-based applications, and time of arrival (ToA)-based applications. For example, by estimating three distances from a target to three receivers 10, the location of the target can be computed. The distance between each target and each receiver 10 is estimated by estimating the ToA. The ToAs are estimated through the UWB pulse sequence sent from the target. As soon as timing is acquired, each UWB receiver node is separated through a unique time-hopping pseudo-random code.

Similar concepts can be applied in the case of passive targets, as in radar localization. In this case, one of the receivers 10 operates as a transceiver, where it transmits an ultra-wideband signal that is reflected by the target and is received by other receivers 10. Assuming that the UWB transceiver and the rest of the receivers 10 are synchronized using the same clock, ToA and the target location can be estimated.

The non-coherent ultra-wideband receiver 10 may also be used for short-range, high data rate transmission, for example. Due to its high bandwidth, UWB communication can provide a very high transmission rate (several hundreds of Mbps). One application of short-range, high data rate transmission is wireless multimedia transfer. For example, multiple multimedia devices (e.g., televisions, game consoles, cameras, etc.) may communicate through a UWB link. The non-coherent ultra-wideband receiver 10 can be incorporated at the receiver side of any of these devices to facilitate the reception of the UWB signal. For example, if the non-coherent ultra-wideband receiver 10 is incorporated into a television receiver, the UWB receiver 10 would send the received data from another device to the television's receiver front end. The received data would then go through the regular blocks inside the receiver, such as the descrambler, MPEG multiplexer, CPU middleware, etc.

Another exemplary application is structural health monitoring. In structural health monitoring (SHM), wireless sensors are deployed to monitor the conditions of civil infrastructures, such as bridges, dams, stadiums and wind turbines. SHM networks collect, log and analyze real-time data, such as vibration signals. In the example of a bridge, sensors would be distributed across the bridge's span to collect vibration signals, which are then used to study the mode shapes of the bridge and detect any damage. All sensors could send their collected vibration signal through a UWB channel to a fusion center, where the non-coherent ultra-wideband receiver 10 could receive the UWB signals. The fusion center would collect all signals from all sensors and forward them through the network to a company's office for civil engineers to inspect.

Figure 4:
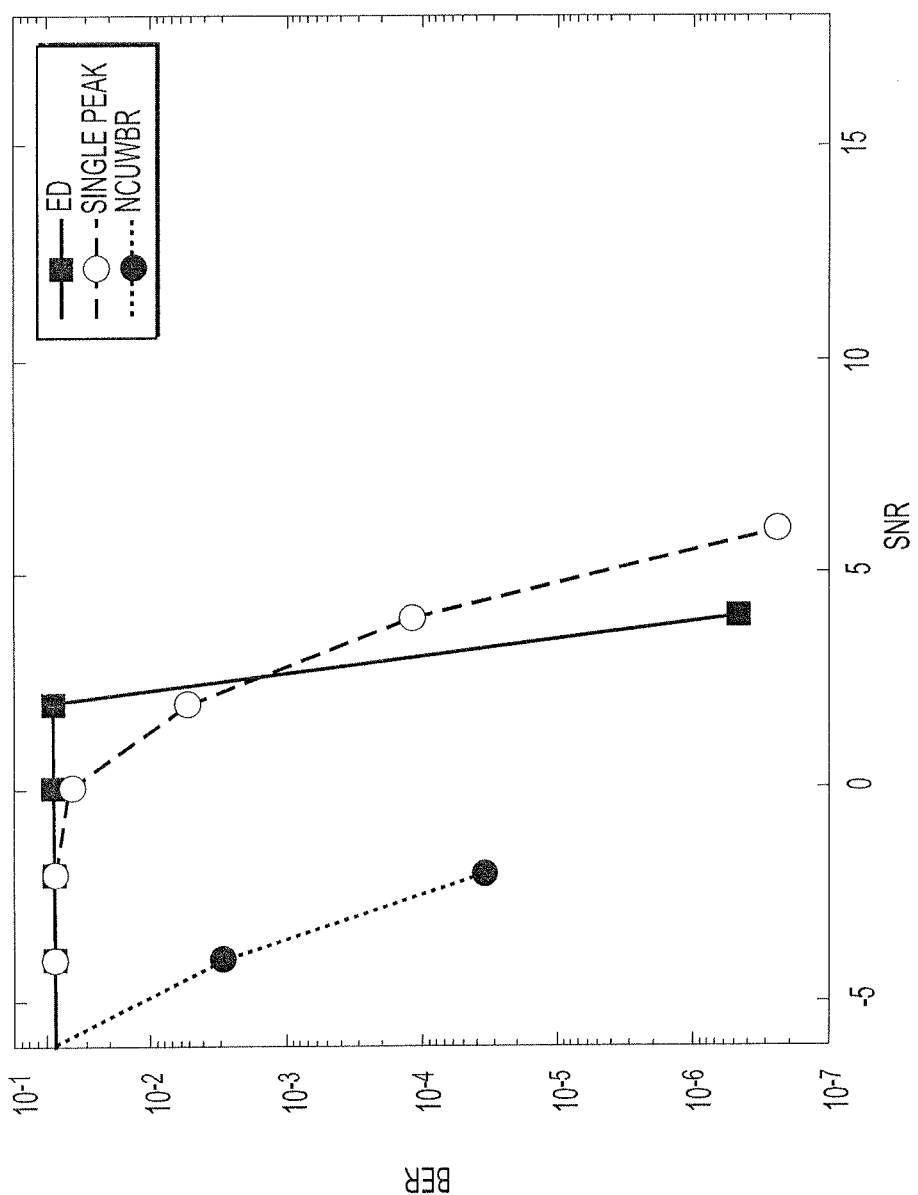
FIG. 4 is a plot comparing bit error rate (BER) as a function of signal-to-noise ratio (SNR) of the present non-coherent ultra-wideband receiver (NCUWBR) against that of a conventional energy detection (ED) receiver and a conventional single peak detection receiver for a transmission rate of 50 Mbps.
Figure 5:
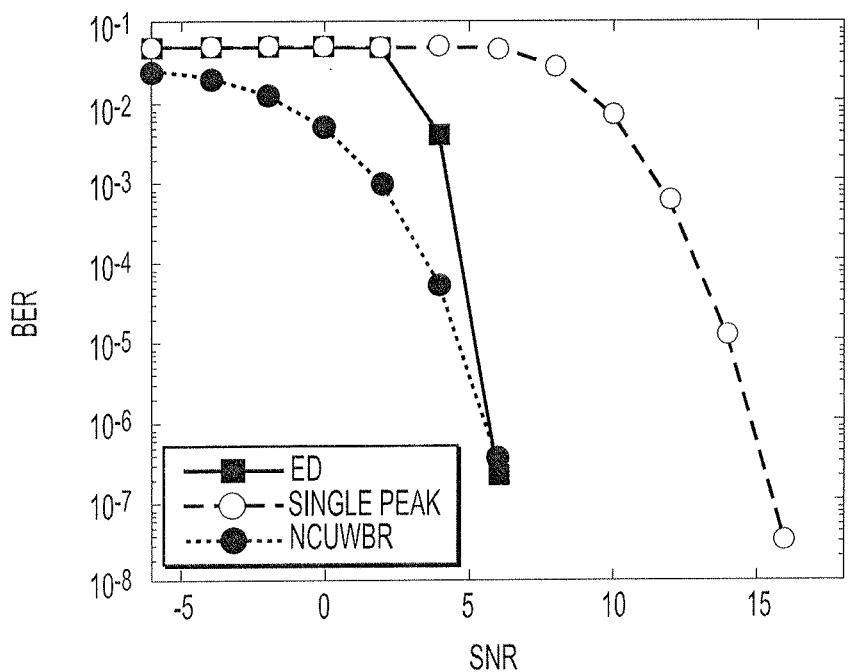
FIG. 5 is a plot comparing bit error rate (BER) as a function of signal-to-noise ratio (SNR) of the present non-coherent ultra-wideband receiver (NCUWBR) against that of a conventional energy detection (ED) receiver and a conventional single peak detection receiver for a transmission rate of 500 Mbps.
Figure 6:
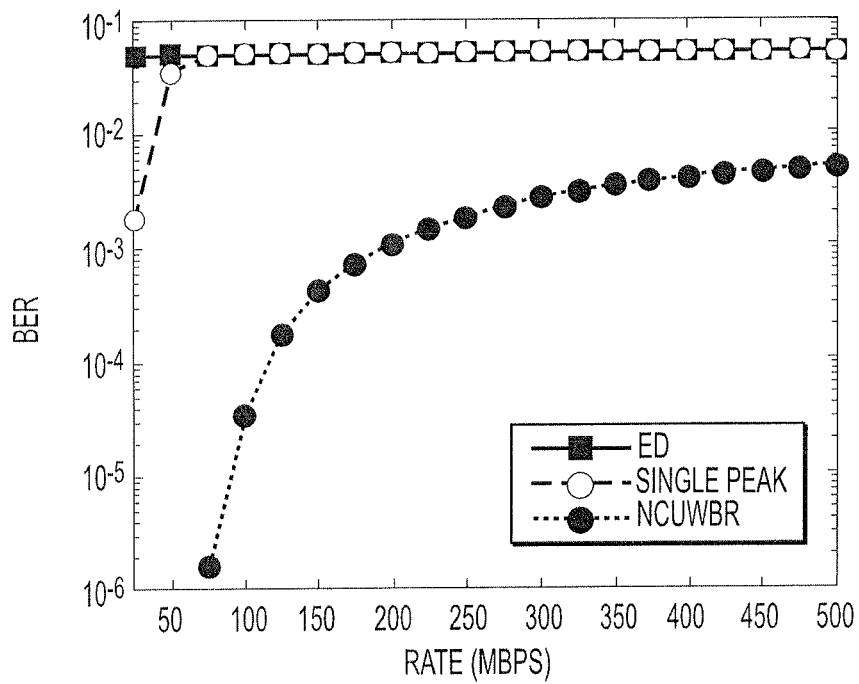
FIG. 6 is a plot comparing bit error rate (BER) as a function of transmission rate of the present non-coherent ultra-wideband receiver (NCUWBR) against that of a conventional energy detection (ED) receiver and a conventional single peak detection receiver for a SNR of 0 dB.
Figure 7:
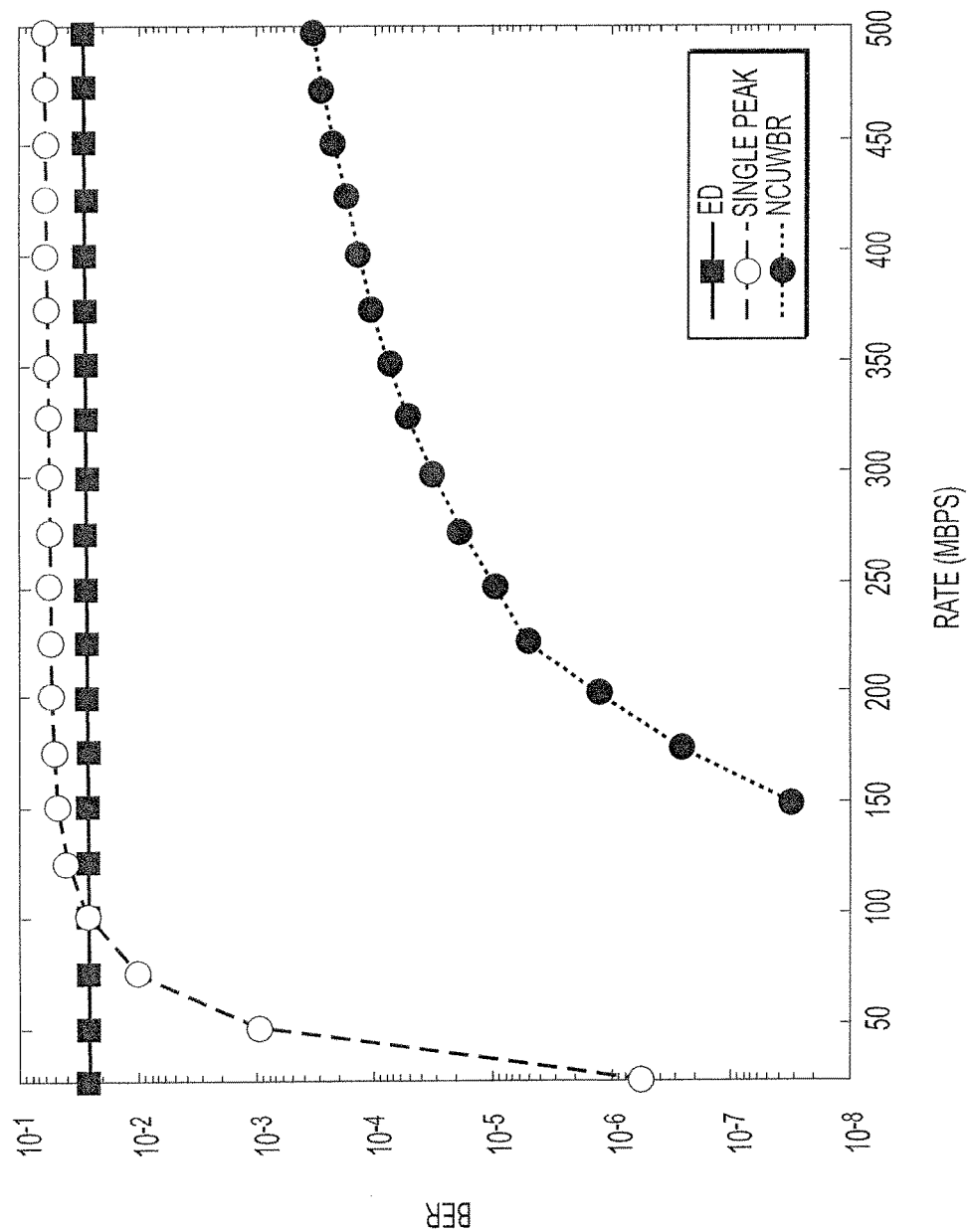
FIG. 7 is a plot comparing bit error rate (BER) as a function of transmission rate of the present non-coherent ultra-wideband receiver (NCUWBR) against that of a conventional energy detection (ED) receiver and a conventional single peak detection receiver for a SNR of 3 dB.

FIGS. 4 and 5 compare the bit error rate (BER) of non-coherent ultra-wideband receiver (NCUWBR) 10 against conventional UWB non-coherent receivers, including an energy detection (ED) receiver and a single peak detection receiver. FIGS. 4 and 5 show the BER vs. the SNR for transmission rates of 50 Mbps and 500 Mbps, respectively. FIGS. 6 and 7 show the BER vs. transmission rate for SNR=0 and 3 dB, respectively. As can be readily seen, NCUWBR 10 improves the dynamic range for up to 9 dB, which is a significant improvement. For a particular SNR and transmission rate, NCUWBR 10 reduces the BER with several orders of magnitude. For example, for a transmission rate of 150 Mbps at SNR=3 dB, NCUWBR 10 exhibits a bit error rate that is lower than that of energy detection and single peak receivers by seven orders of magnitude, which is a drastic improvement of the BER.

It is to be understood that the non-coherent ultra-wideband receiver is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of processing received ultra-wideband signals, comprising the steps of:
    receiving a non-coherent ultra-wideband signal having a plurality of pulses and a known transmission rate;
    estimating a signal-to-noise ratio of the non-coherent ultra-wideband signal;
    down-converting the received ultra-wideband signal to a lower frequency;
    sampling the down-converted received ultra-wideband signal multiple times at regular time intervals within each of the pulses to obtain a set of time domain samples of voltage amplitude for each of the pulses of the non-coherent ultra-wideband signal;
    sorting each of the time domain samples of each of the sets of time domain samples by the amplitude to form sets of sorted time domain samples, assigning a sorting index value to each of the samples according to position of the sample in the sorted set;
    for each of the sorted sets, retrieving a secondary index value from a lookup table based on the known transmission rate and the estimated signal-to-noise ratio, the secondary index value corresponding to a number of samples in a sampling period exceeding the threshold value at the known transmission rate and estimated signal-to-noise ratio when a binary one is transmitted;
    for each of the sorted sets, selecting a sorted time domain sample of the set of sorted time domain samples, the selected sorted time domain sample having a sorting index value equal to the secondary index value retrieved from the lookup table when the samples are sorted in order of descending magnitude, or a sorting index value equal to the number of samples in the set of sorted time domain samples less the secondary index value when the samples are sorted in order of increasing magnitude;
    for each of the sorted sets, comparing the amplitude of the selected sorted time domain sample against a threshold value; and
    for each of the sorted sets, outputting a binary value of one if the amplitude of the selected sorted time domain sample is greater than the threshold value, and outputting a binary value of zero if the amplitude of the selected sorted time domain sample is less than or equal to the threshold value.

2. A non-coherent ultra-wideband receiver, comprising:
    an antenna for receiving a non-coherent ultra-wideband signal, the non-coherent ultra-wideband signal having a plurality of pulses and a known transmission rate;
    a signal-to-noise ratio estimator for estimating a signal-to-noise ratio of the non-coherent ultra-wideband signal; and
    a processing circuit having:
        a sampling circuit for obtaining a set of time domain amplitude samples from each of the pulses of the non-coherent ultra-wideband signal;
        a sorting circuit for sorting each of the samples in each of the sets of time domain samples by the amplitude to form a set of sorted time domain samples, and for assigning a sorting index value to each of the samples in the sets;
        a retrieval circuit for retrieving a secondary index value for each of the sets of sorted time domain samples from a lookup table given the transmission rate and the estimated signal-to-noise ratio as input, the secondary index value corresponding to a number of samples in a sampling period exceeding the threshold value at the known transmission rate and estimated signal-to-noise ratio when a binary one is transmitted;
        a selector circuit for selecting a sorted time domain sample for each of the sets of sorted time domain samples, the selected sorted time domain samples having a sorting index value equal to the secondary index value retrieved from the lookup table when the samples are sorted in order of descending amplitude, or a sorting index value equal to the number of samples in the set of sorted time domain samples less the secondary index value when the samples are sorted in order of increasing magnitude;

a comparison circuit for comparing the amplitude of the selected sorted time domain samples against a threshold value; and an output circuit for outputting, for each of the sets of sorted time domain samples, a binary value of one if the amplitude of the selected sorted time domain sample is greater than the threshold value, and outputting a binary value of zero if the amplitude of the selected sorted time domain sample is less than or equal to the threshold value.

3. The non-coherent ultra-wideband receiver as recited in claim 2, further comprising a bandpass filter in communication with the antenna.

4. The non-coherent ultra-wideband receiver as recited in claim 3, further comprising a low-noise amplifier in communication with the bandpass filter.

5. The non-coherent ultra-wideband receiver as recited in claim 4, further comprising:

a mixer in communication with the low-noise amplifier; and a local oscillator in communication with the mixer, the oscillator and mixer being configured for downconverting frequency of the ultra-wideband signal.

6. The non-coherent ultra-wideband receiver as recited in claim 5, further comprising an analog-to-digital converter in communication with the mixer and the signal-to-noise ratio estimator.

\* \* \* \* \*